UNITED STATES PATENT OFFICE.

AUGUST E. SCHUTTE, OF NORTHBORO, MASSACHUSETTS.

WOODEN PAVING-BLOCK.

1,299,238.      Specification of Letters Patent.      Patented Apr. 1, 1919.

No Drawing.     Application filed July 27, 1915. Serial No. 42,203.

*To all whom it may concern:*

Be it known that I, AUGUST E. SCHUTTE, a citizen of the United States, residing at Northboro, county of Worcester, State of Massachusetts, (whose post-office address is Northboro, Massachusetts,) have invented a new and useful Improvement in Wooden Paving-Blocks.

The object of my invention is to provide a wooden paving block that will maintain its size and shape and neither expand or contract under varying atmospheric conditions.

My invention consists in a block that has been expanded to its maximum of expansion and its pores filled with a hygroscopic agent such as a solution of magnesium chlorid or calcium chlorid, or a mixture of calcium chlorid and magnesium chlorid.

With the block expanded to its maximum of expansion and with the hygroscopic agent filling its pores, the block will not expand, nor will it dry and contract, for, on account of the nature of the pore filling medium enough moisture will be absorbed from the air to prevent such contracting. Therefore the block which is manufactured and used at its maximum of expansion will never cause the pavement to heave through further enlargement on account of absorbing water, nor will it contract for it cannot become dry.

The blocks so treated can be of any desired wood. Some of the more inferior woods seem to be as suitable as long leaf pine which is now considered as the best for paving purposes.

In treating my material any method can be used, although I prefer placing the blocks to be treated in vats or tanks containing the solution and bringing the liquid to a boil, allowing the blocks to cool in the liquid, and repeating the operation once or twice, depending somewhat on the nature of the wood and its permeability. The blocks can then be laid on either sand or concrete foundation in the usual way.

Having described my invention what I claim as new and desire to cover by patent is:—

A wooden paving block having a maximum of expansion and filled with a hygroscopic agent whereby the block is rendered non-contracting.

AUGUST E. SCHUTTE.

Copies of this patent may be obtained for five cents each, by addressing the "Commissioner of Patents, Washington, D. C."